United States Patent [19]

Kuzuoka

[11] Patent Number: 5,561,411
[45] Date of Patent: Oct. 1, 1996

[54] TEMPERATURE SENSOR FOR HIGH TEMPERATURE AND METHOD OF PRODUCING THE SAME

[75] Inventor: Kaoru Kuzuoka, Toyota, Japan

[73] Assignee: Nippondenso Co., Ltd., Kariya, Japan

[21] Appl. No.: 271,629

[22] Filed: Jul. 7, 1994

[30] Foreign Application Priority Data

Jul. 8, 1993 [JP] Japan ................................. 5-194280

[51] Int. Cl.$^6$ ................................................. H01C 7/10
[52] U.S. Cl. ............................ 338/22 SD; 338/34
[58] Field of Search ........................ 338/22 R, 22 SD, 338/195, 25, 50, 254, 255, 34; 29/593, 612; 374/185

[56] References Cited

U.S. PATENT DOCUMENTS

| | | | |
|---|---|---|---|
| 3,958,209 | 5/1976 | Soda et al. | 338/22 R |
| 4,200,970 | 5/1980 | Schonberger | 338/195 |
| 5,051,718 | 9/1991 | Satake et al. | 338/22 R |
| 5,142,266 | 8/1992 | Friese et al. | 338/22 R |

FOREIGN PATENT DOCUMENTS

| | | |
|---|---|---|
| 50-90994 | 7/1975 | Japan . |
| 54-118599 | 9/1979 | Japan . |
| 56-104401 | 8/1981 | Japan . |
| 62-211525 | 9/1987 | Japan . |
| 1-260355 | 10/1989 | Japan . |
| 2-87032 | 3/1990 | Japan . |
| 3-10131 | 1/1991 | Japan . |

*Primary Examiner*—Tu Hoang
*Attorney, Agent, or Firm*—Cushman Darby & Cushman, L.L.P.

[57] ABSTRACT

According to the present invention, a temperature sensor for high temperature comprises a ceramic plate on the surface of which is provided a thermistor layer, electrodes connected to the thermistor layer, and the thermistor layer containing $ZnCr_2O_4$. It is preferable that the thermistor layer contain a resistance conditioning agent composed of either ZnO or $Cr_2O_3$ or both, and that it contains at least one of the sintering auxiliaries selected from the group: $SiO_2$, CaO, MgO, $CaCO_3$, kaolin, and talc. Accordingly, it is possible to obtain stable resistance-temperature characteristics at high temperature as well as superior heat resistance.

7 Claims, 2 Drawing Sheets

TEMPERATURE SENSOR FOR HIGH TEMPERATURE AND METHOD OF PRODUCING THE SAME

BACKGROUND OF THE INVENTION

1. Field of the Invention

The present invention relates to a temperature sensor for high temperature which has superior characteristics for heat resistance and a method of producing the same, and more particularly to the material of the thermistor layer.

2. Description of the Related Art

Temperature sensors for high temperature, which employ thermistors, are widely used in various industrial fields. For example, such temperature sensors are applied to temperature sensor for controlling gas combustion or exhaust temperature sensors for automobiles, etc.

These temperature sensors for high temperature are composed of a thermistor layer, electrodes connected to the thermistor layer, an insulator portion which protects these components, and the other components. In a conventional type of such temperature sensors for high temperature, in case that the bulk type thermistor layer is employed, the thermistor layer is made by solidifying powdered chromium oxide or aluminum oxide material (Japanese examined Patent Publication No. 56-23281).

In addition, as a conventional type of thick filmed type thermistor layer, a composition composed of powdered oxides of manganese, cobalt, nickel, iron, aluminum, and silicon, powdered glass and rhodium dioxide ($RhO_2$) are made into a paste and printed with the electrodes onto a ceramic plate employed as the insulator, then baked (Japanese unexamined Patent Publication No. 54-118599).

Additionally, a ceramic plate using alumina is generally employed as the above insulator.

However, as the thermistor layer containing the above composition reacts violently with alumina at high temperatures and undergoes interdiffusion, the resistance-temperature characteristics of the thermistor layer are made unstable. It is therefore difficult to seal and incorporate the thermistor layer between the ceramic plates.

Meanwhile, in case that the thermistor layer is bared, as it is directly exposed to the combustion flames or the like, the thermistor layer is deteriorated and the bonds between the thermistor layer and the electrodes are also badly influenced.

SUMMARY OF THE INVENTION

The present invention is made in view of such conventional problems, the object of the present invention is to provide a temperature sensor for high temperature which has stable resistance temperature characteristics at high temperature and superior characteristics of heat resistance.

According to first aspect of the present invention, a temperature sensor for high temperature comprises a ceramic plate for electrical insulator, a thermistor layer on a surface of the ceramic plate, and electrodes connected to the thermistor layer, wherein the thermistor layer contains zinc chromate ($ZnCr_2O_4$).

At this point, it should be noted that the thermistor layer contains $ZnCr_2O_4$. In addition to $ZnCr_2O_4$, the thermistor contains materials such as the resistance conditioning agents and sintering auxiliaries as follows.

It is preferable that $ZnCr_2O_4$ composition ratio of the thermistor layer is 5 to 90 wt. %. That is to say, it is difficult for the thermistor to sufficiently obtain the effect when the content ratio of the $ZnCr_2O_4$ is less than 5 wt. %. It is further preferable that the lower limit of the $ZnCr_2O_4$ is 10 wt. %. However, in case that the content ratio of the $ZnCr_2O_4$ exceeds 90 wt. %, there are problems in durability because brittleness is deteriorated when sintered.

In addition, it is preferable that the $ZnCr_2O_4$ is produced by the following method. That is to say, $ZnCr_2O_4$ is obtained by mixing zinc oxide (ZnO) powder and chromium trioxide ($Cr_2O_3$) powder at a mole ratio of 1:1, then pre-baking at a temperature of, for example 1,000 to 1,300° C.

Next, it is preferable that the thermistor layer contains a resistance conditioning agent composed of either Zinc oxide (ZnO) or $Cr_2O_3$ or both. It is preferable that the thermistor layer contains at least one of these two materials with a limit of 50 wt. %, in which the ZnO is for increasing resistance value and the $Cr_2O_3$ is for reducing resistance value.

In case that the resistance conditioning agent in the thermistor layer exceeds 50 wt. %, the thermistor layer reacts with the alumina composition and the like in the ceramic plate, and the stable characteristics of resistance-temperature are not obtained. In addition, it is also acceptable for the thermistor layer to contain no resistance conditioning agent. This is because the resistance value of the thermistor layer is only within a range suitable for measurement.

Next, it is preferable that the thermistor layer contains at least one of the sintering auxiliaries selected from the group: silicon dioxide ($SiO_2$), calcium oxide (CaO), magnesium oxide (MgO), calcium carbonate ($CaCO_3$), kaolin, and talc. It is preferable for the thermistor layer to contain from 0.5 to 30 wt. % of sintering auxiliary. In case that the content ratio is less than 0.5 wt. %, the thermistor layer may become brittle. In case that the content ratio exceeds 30 wt. %, however, the content ratio of the $ZnCr_2O_4$ is conversely reduced, and the thermistor may not serves function sufficiently.

Next, according to second aspect of the invention, a method of producing the temperature sensor for high temperature comprises steps of setting a thermistor raw-material layer containing $ZnCr_2O_4$ on a surface of a ceramic green sheet to form a thermistor layer, laminating another ceramic green sheet on the thermistor layer, and press-fitting and baking the thermistor layer and the ceramic green sheet.

Additionally, slurry and moldings are available for the thermistor raw-material layer. The slurry is in paste form. The slurry is, for example, painted on the ceramic green sheet by the screen printing method or the like. The moldings is prepared by forming raw-material powder for thermistor layer with the press-forming method, doctor blade method, or the like, and then this molding is bonded on the ceramic green sheet.

The slurry, for example, is prepared by adding the raw-material powder to ethyl cellulose as a binder and a mixed solution of terpineol as a solvent. The binder is added such that its content ratio relative to the raw-material powder is 10 to 40 wt. %. The mixture is then kneaded with, for example, a triple roller and an agitating machine.

A paste of a metal conductor with a high melting point, such as platinum, is printed as the electrodes on the ceramic green sheet on which the slurry has been printed. Furthermore, in order to prevent deterioration due to the direct exposure of the electrodes and thermistor layer to the atmosphere at a high temperature, another ceramic green sheet is placed thereon and stamped, thereby forming a sealed laminating structure.

Consequently, the molding is baked and thereby producing a temperature sensor for high temperature. A baking temperature of 1,300 to 1,650° C. is preferred. At less than 1,300° C., there may be problem with its strength and durability, on the other hand, at more than 1,650° C., there may be another problem with its structure and characteristics, resulting in failure to function as a temperature sensor for high temperature.

A thermistor is formed into a thick film produced by the above process, accordingly, it is compact.

Next it is preferable that the ceramic plate be a material for electrical insulator and employ one or two or more types of materials chosen from the group: alumina, mullite, magnesium oxide (MgO), zirconium dioxide ($ZrO_2$), titanium dioxide ($TiO_2$), steatite, forsterite, and beryllium oxide (BeO). From the view of cost, it is preferable to employ ceramic which contains alumina. In forming the ceramic green sheet, it is preferable to add at least one type of MgO, $SiO_2$, kaolin, talc, $CaCO_3$, or the like as a sintering auxiliary. Additionally, in forming the ceramic green sheet, it is preferable to use the doctor blade method. It is further acceptable to use either extrusion forming or powder forming to form the ceramic plate.

According to the temperature sensor for high temperature of the present invention, the thermistor layer contains $ZnCr_2O_4$. $ZnCr_2O_4$ has a high melting temperature and does not react with the ceramic plate for electrical insulation even at high temperature.

Therefore, there is no interdiffusion of the thermistor layer and ceramic plate for electrical insulation.

Because of this, the characteristic of the resistance-temperature of thermistor layer are not badly influenced. In particular, in case that alumina is employed as the ceramic plate for electrical insulation, as the alumina does not react with the $ZnCr_2O_4$, and the remarkable effect as described the above are obtained.

For this reason, the stable characteristics of the resistance-temperature can be obtained even at high temperature.

In addition, as the thermistor layer of the present invention employs $ZnCr_2O_4$, superior characteristics of heat resistance is also obtained. Moreover, according to the above producing method, it is possible to manufacture the temperature sensor for high-temperature easily.

Accordingly, it is possible to provide the temperature sensor which has stable characteristics of resistance temperature at high temperature and superior characteristics of the heat resistance as well as a method for producing the same.

DETAILED DESCRIPTION OF THE PREFERRED EMBODIMENTS

An embodiment of the temperature sensor for high temperature and method for producing the same of the present invention are described below with reference to FIGS. 1 and 2.

Figure 1:
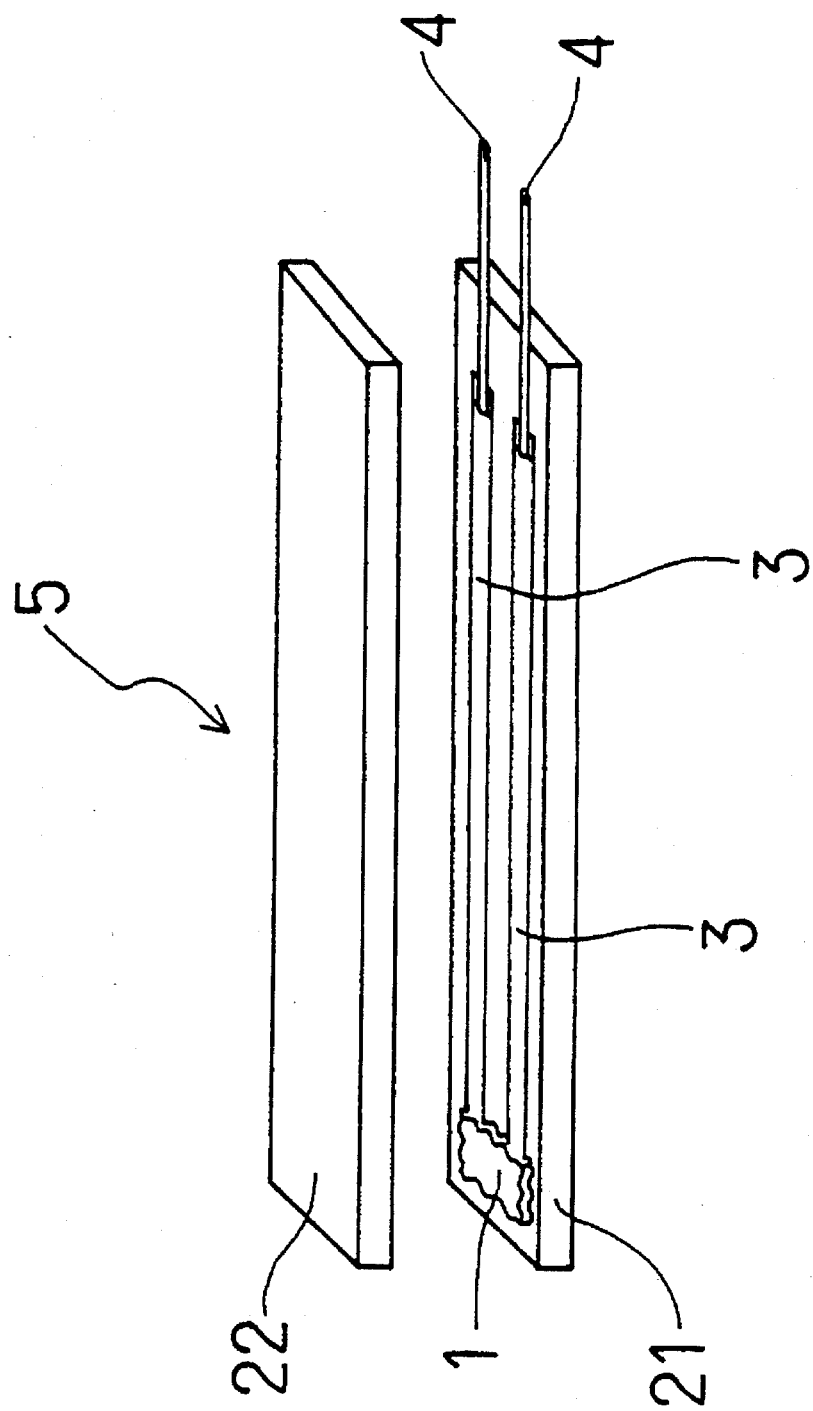
FIG. 1 is an exploded perspective view of a temperature sensor in first embodiment.

As shown in FIG. 1, the temperature sensor 5 for high-temperature of the embodiment has a ceramic plate 21 for electrical insulator, a thermistor layer 1 provided on the end of the surface of the ceramic plate 5 for electrical insulator, and two electrodes 3 which are connected to the thermistor layer 1. In addition, a ceramic plate 22 for electrical insulator is press-fitted on the surface thereof. The thermistor layer 1 contains a resistance conditioning agent composed of $ZnCr_2O_4$ and ZnO, and a sintering auxiliary composed of $SiO_2$. Additionally, the electrodes 3 are connected to respective lead wires 4. The material of the ceramic plates 21 and 22 is alumina.

Next, the thermistor layer material is produced by the following process.

Firstly, raw-material powder composed of ZnO powder and $Cr_2O_3$ powder which is mixed at a mole ratio of 1:1 is put in a pot, and mixed with a ball mill. Then, this mixed powder is pre-baked at 1,100° C. to obtain $ZnCr_2O_4$. Next, ZnO 20 wt. % as a resistance conditioning agent and $SiO_2$ 30 wt. % as a sintering auxiliary are compounded with this $ZnCr_2O_4$ at 50 wt. % and mixed again to produce the thermistor layer material.

Meanwhile, ethyl cellulose as a binder and terpineol as a solvent are mixed at a weight ratio of 1:9, and the organic vehicle is adjusted. This organic vehicle is then added at 30 wt. % to the thermistor layer material at 100 wt. %, and mixed with a triple roller and agitating machine into paste form.

In addition, the ceramic plates are produced by the following process. PVB 5 wt. % as binder, ethanol and butanol 40 wt. % as solvent are added to material powder 100 wt. % composed of alumina 95 wt. % and MgO 5 wt. % as a sintering auxiliary, thereby making a slurry. This slurry is formed with the doctor blade method to prepare a ceramic green sheet with a thickness of approximately 0.5 mm.

Next, the paste for thermistor layer is screen-printed on one end of the ceramic green sheet. Simultaneously, two electrodes are printed with platinum paste. Moreover, lead wires are connected to both electrodes. Furthermore, another ceramic green sheet same as the above is overlaid and press-formed. The conditions during press-fitting are 90° C. and 10 MPa.

The above molding is baked at conditions of 1,550° C. and for one hour to obtain the .temperature sensor 5 for high temperature shown in FIG. 1.

Figure 2:
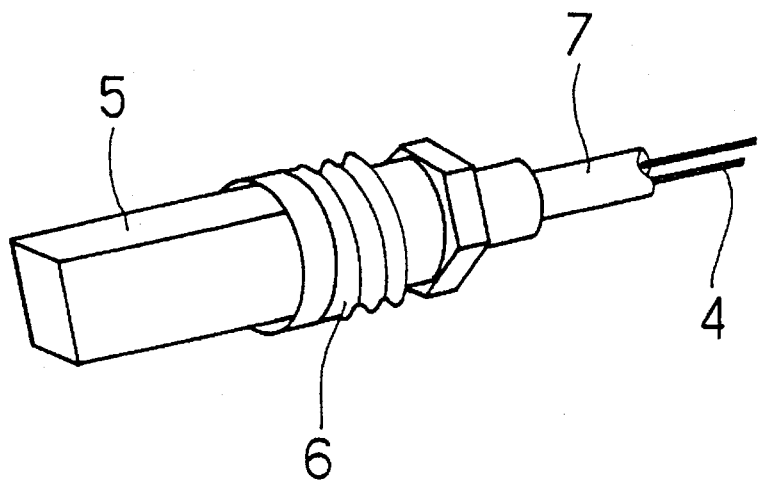
FIG. 2 is a perspective view of the temperature sensor of the first embodiment attached to a plug.

Next, as shown in FIG. 2, the temperature sensor 5 for high temperature is provided with a plug 6 and lead wire protective cover 7.

(SECOND EMBODIMENT)

In this embodiment, the resistance value (Ω) and resistance-temperature coefficient (K) were measured for temperature sensors for high temperature which were prepared by variously changing the mixture ratios and materials of the $ZnCr_2O_4$, sintering auxiliaries, and resistance conditioning agents in the thermistor layer. Except for the above conditions of the thermistor layer, the method for production was identical to that for the first embodiment.

Additionally, the size of the electrodes was made uniform at a length off 2 mm, a width of 0.5 mm, and a thickness of 50 microns. The resistance value was measured at 800° C. The results are shown in Table 1.

TABLE 1

| No. | thermistor layer composition | | | resistance value (Ω) (800° C.) | temperature coefficient (K) |
|---|---|---|---|---|---|
| | $ZnCr_2O_4$ (wt %) | sintering auxiliary (wt %) | resistance conditioning agent (wt %) | | |
| A | 90 | $SiO_2$ 10 | — | 300 | 4000 |
| B | 70 | $SiO_2/CaO$ 5/5 | ZnO 20 | 420 | 4600 |
| C | 70 | ↑ | $Cr_2O_3$ 20 | 120 | 3800 |
| D | 45 | ↑ | $Cr_2O_3$ 45 | 80 | 3500 |

As can be seen from Table 1, each of the test materials (A to D) relating to the present invention can easily be matched to circuit with regard to the resistance value, and shows superior performance for use in wide temperature ranges.

In addition, each has a high resistance-temperature coefficient of 3,500 to 4,600K, and shows superior performance with high precision.

Furthermore, durability testing was performed for the temperature sensor for high temperature at conditions of 1,200° C. and for 100 hours. and there is no substantial change in the resistance-temperature coefficient and no deterioration.

In this manner, it can be understood that the temperature sensor for high temperature of the present invention shows superior resistance-temperature characteristics and heat resistance by employing $ZnCr_2O_4$.

(THIRD EMBODIMENT)

In this embodiment, a temperature sensor for high temperature use is prepared based on the first embodiment, the characteristics are explained with reference to FIG. 3 for the temperature dependency of its resistance value.

Figure 3:
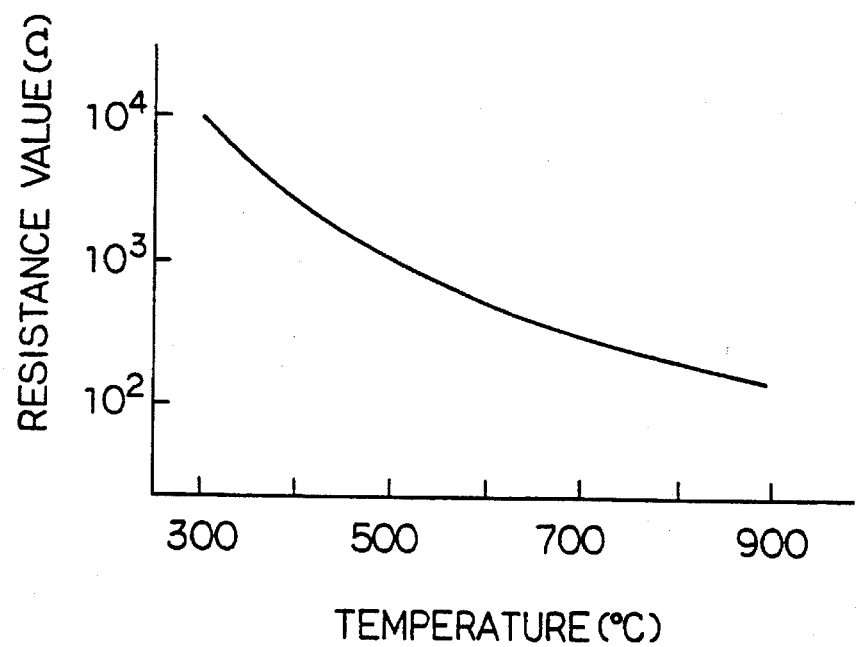
FIG. 3 is a graph showing a relationship between temperature and resistance value in the third embodiment.

In FIG. 3, the vertical axis is the resistance value (Ω) and the horizontal axis is the measured temperature (°C.). The thermistor layer is composed of test material A in the second embodiment, which is $ZnCr_2O_4$ 90 wt. % and sintering agent $SiO_2$ 10 wt. %.

As can be seen from the figure, the resistance value of the temperature sensor for high temperature declines from on the order of $10^4$ Ω at 300° C. to on the order of $10^3$ Ω at 500° C. and on the order of $10^2$ Ω at 900° C.

In other words, the change in resistance is a rapid decline in comparison with the rate of the temperature rinse. For this reason, it is possible to measure temperature with high precision.

As described the above, the present invention has superior characteristics as a temperature sensor for high temperature.

What is claimed is:

1. A temperature sensor for high temperature comprising:

a first ceramic plate for electrical insulation;

a thermistor layer provided on a surface of said first ceramic plate, said thermistor layer being composed of $ZnCr_2O_4$;

electrodes connected to the thermistor layer; and a second ceramic plate in contact with said thermistor layer for sealingly sandwiching said thermistor layer and said electrodes between said first ceramic plate and said second ceramic plate.

2. A temperature sensor according to claim 1, wherein said thermistor layer contains a resistance conditioning agent selected from the group consisting of Zinc oxide (ZnO), $Cr_2O_3$ and mixtures thereof.

3. A temperature sensor according to claim 1, wherein said thermistor layer contains at least one of sintering auxiliaries selected from the following group: silicon dioxide ($SiO_2$), calcium oxide (CaO), magnesium oxide (MgO), calcium carbonate ($CaCO_3$), kaolin, and talc.

4. A temperature sensor according to claim 1, wherein said ceramic plate is selected from the group consisting of alumina, mullite, magnesium oxide (MgO), zirconium dioxide ($ZrO_2$), titanium dioxide ($TiO_2$), steatite, forsterite, beryllium and mixtures thereof.

5. A method of producing a temperature sensor for high temperature comprising steps of:

setting a thermistor raw-material layer containing $ZnCr_2O_4$ on a surface of a ceramic green sheet to form a thermistor layer, laminating another ceramic green sheet on said thermistor layer, and press-fitting and baking said thermistor layer and said ceramic green sheet.

6. A temperature sensor according to claim 1, wherein of 5–90 weight % said thermistor layer is $ZnCr_2O_4$.

7. A temperature sensor according to claim 1, wherein said thermistor layer is composed of $ZnCr_2O_4$ and at least one of ZnO and $Cr_2O_3$.

* * * * *